(12) United States Patent
Sirilutporn et al.

(10) Patent No.: US 7,164,554 B2
(45) Date of Patent: Jan. 16, 2007

(54) DISK DRIVE WITH HUB AND APPARATUS FOR PREVENTION OF LUBRICATION MIGRATION FOR LUBRICATED CLAMP FASTENERS IN DISK DRIVE APPLICATIONS

(75) Inventors: Andre Sirilutporn, Milpitas, CA (US); Jr-Yi Shen, Sunnyvale, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 391 days.

(21) Appl. No.: 10/881,263

(22) Filed: Jun. 30, 2004

(65) Prior Publication Data

US 2006/0002012 A1    Jan. 5, 2006

(51) Int. Cl.
G11B 17/022 (2006.01)
G11B 25/04 (2006.01)
(52) U.S. Cl. .................. 360/99.12; 369/263.1
(58) Field of Classification Search ............ 360/99.12, 360/99.08, 97.01, 88; 369/264, 270.1, 271.1, 369/263.1, 258.1, 261, 176; 720/604, 695, 720/697, 698, 696, 706, 712, 716, 715
See application file for complete search history.

(56) References Cited

U.S. PATENT DOCUMENTS

| | | | |
|---|---|---|---|
| 4,358,803 A * | 11/1982 | Van Der Giessen ..... | 360/99.12 |
| 5,422,768 A | 6/1995 | Roehling et al. | |
| 5,627,699 A | 5/1997 | Ota et al. | |
| 5,675,452 A * | 10/1997 | Nigam ..................... | 360/97.02 |
| 5,694,269 A * | 12/1997 | Lee .......................... | 360/98.08 |
| 5,822,151 A | 10/1998 | Albrecht et al. | |
| 6,255,750 B1 | 7/2001 | Mohajerani et al. | |
| 6,504,674 B1 | 1/2003 | Yoshida et al. | |
| 2001/0014076 A1* | 8/2001 | Yamanaka ................. | 369/270 |
| 2003/0218830 A1 | 11/2003 | Khanna et al. | |
| 2004/0047071 A1* | 3/2004 | Aoishi ..................... | 360/99.12 |

FOREIGN PATENT DOCUMENTS

| | | |
|---|---|---|
| JP | 62-18851 U | 2/1987 |
| JP | 1-59977 U | 4/1989 |
| JP | 4143979 | 5/1992 |
| JP | 4146585 | 5/1992 |
| JP | 5128778 | 5/1993 |
| JP | 9259497 | 10/1997 |
| JP | 3062379 | 3/1999 |
| JP | 2002298479 | 10/2002 |

* cited by examiner

Primary Examiner—Julie Anne Watko
(74) Attorney, Agent, or Firm—Bracewell & Giuliani LLP

(57) ABSTRACT

A disk clamp for securing a data storage disk to the hub of a spindle motor in a disk drive prevents the migration of lubricant into sensitive areas of the disk drive. The problem of lubrication migration due to the use and presence of fastener lubricant is resolved by using a rib on a composite disk clamp. The rib strengthens the clamp structure and has a sealing ring. The ring has a semi-circular sectional profile with a flat surface that is used to bond the ring to the rib. The ring has elastic properties that compensate for hub vibration to isolate the disk clamp from the hub, and also provides damping between the hub and the disk clamp.

14 Claims, 5 Drawing Sheets

DISK DRIVE WITH HUB AND APPARATUS FOR PREVENTION OF LUBRICATION MIGRATION FOR LUBRICATED CLAMP FASTENERS IN DISK DRIVE APPLICATIONS

BACKGROUND OF THE INVENTION

1. Technical Field

The present invention relates in general to an improved disk drive and, in particular, to an improved system, method, and apparatus for a disk clamp that prevents fastener lubrication from migrating into undesired areas of a disk drive.

2. Description of the Related Art

Data access and storage systems typically comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk.

When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The attachment of the data storage disks to the hub of the spindle motor is accomplished via a disk clamp. The disk clamp retains the disks on the hub by attaching directly to the hub of the motor. A conventional disk clamp 11 (FIGS. 1 and 2) is typically secured to a spindle motor 13 with several screws 15. The clamp engages an adjacent disk 17 to axially restrain the disk 17 and other disks below it, as shown, via spacer rings 19.

Screws are important components in disk drives because they fasten different parts together by delivering load in an axial direction. Axial load is very sensitive to the surface finish of the screw. In order to deliver consistent axial load, screws have been either lubricated or coated/plated with special surface treatments. In terms of performance, lubricated screws tend to deliver more consistent axial load.

Unfortunately, both of these two types of screw load-improving solutions have their shortcomings. For example, plated screws generate undesirable particles when tightened which cause contamination problems. The lubricant for screws also generates contaminant particles, but less than that generated by the plated screws. However, lubricant tends to migrate in dynamic applications, such as the present case when used to join disk clamps and spindle motor hubs and then rotated at high speeds. Lubricant migration causes many types of head-disk interference problems. Thus, an improved system, method, and apparatus that prevents fastener lubrication from migrating into undesired areas of a disk drive would be desirable.

SUMMARY OF THE INVENTION

One embodiment of a disk clamp for securing one or more data storage disks to the hub of a spindle motor in a disk drive is provided with features for preventing the migration of lubricant used in conjunction with the fastener screws thereof. The problem of lubrication migration is resolved by using a rib on a composite disk clamp. The rib strengthens the clamp structure and is provided with a sealing ring, such as an elastomeric or rubber ring. In one version, the ring has a semi-circular or "D-shaped" sectional profile and is bonded on a flat surface thereof to the rib. The ring has elastic properties such that it compensates for hub vibration to isolate the disk clamp from the hub. Moreover, the ring also provides damping between the hub and the disk clamp.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
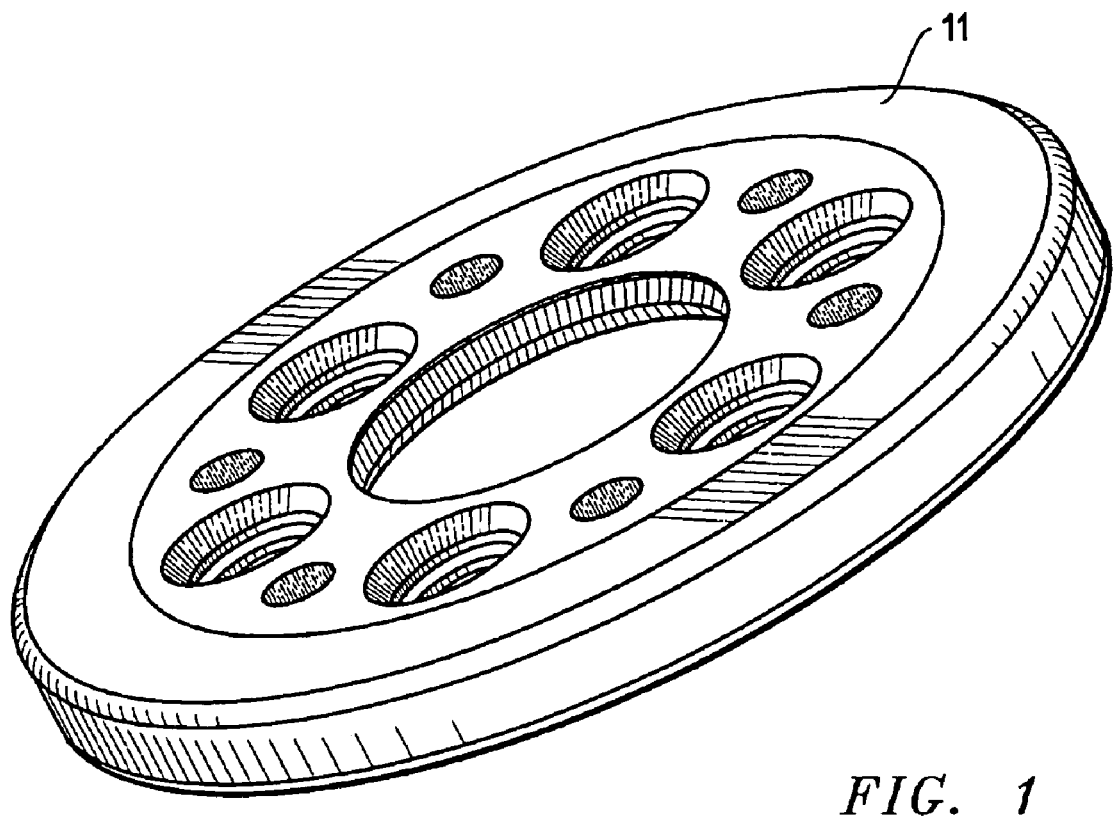
FIG. 1 is an isometric view of a conventional disk clamp.
Figure 2:
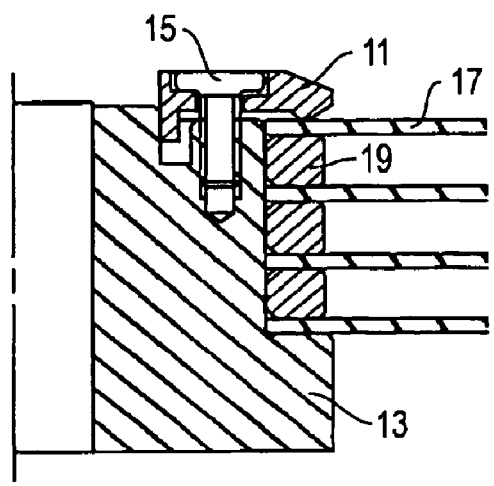
FIG. 2 is a sectional side view of the disk clamp of FIG. 1 installed in a disk drive.
Figure 3:
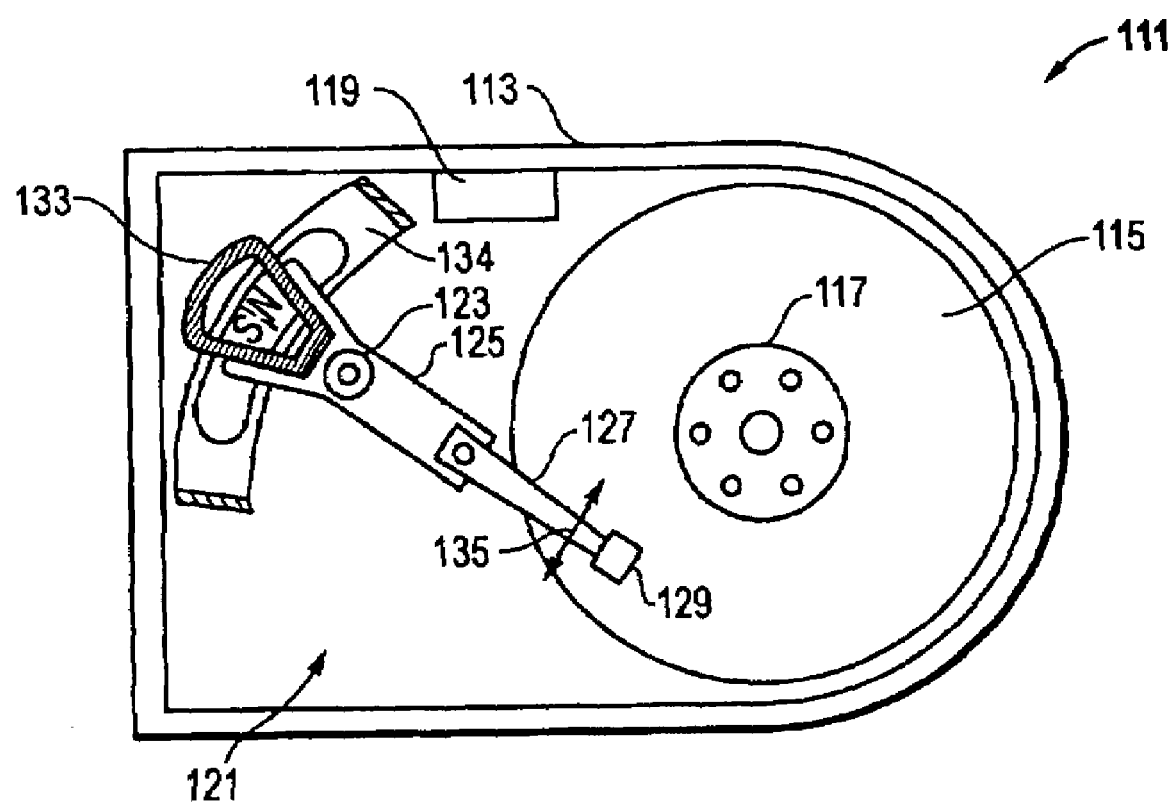
FIG. 3 is a simplified plan view of one embodiment of a disk drive constructed in accordance with the present invention.

Referring to FIG. 3, a schematic drawing of one embodiment of an information storage system comprising a magnetic hard disk file or drive 111 for a computer system is shown. Drive 111 has an outer housing or base 113 containing at least one magnetic disk. When more than one disk 115 is used, the disks are stacked in parallel and closely spaced apart. The disk 115 is rotated by a spindle motor assembly having a central drive hub assembly 117. An actuator 121 comprises at least one actuator arm 125 in the form of a comb that is pivotally mounted to the base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
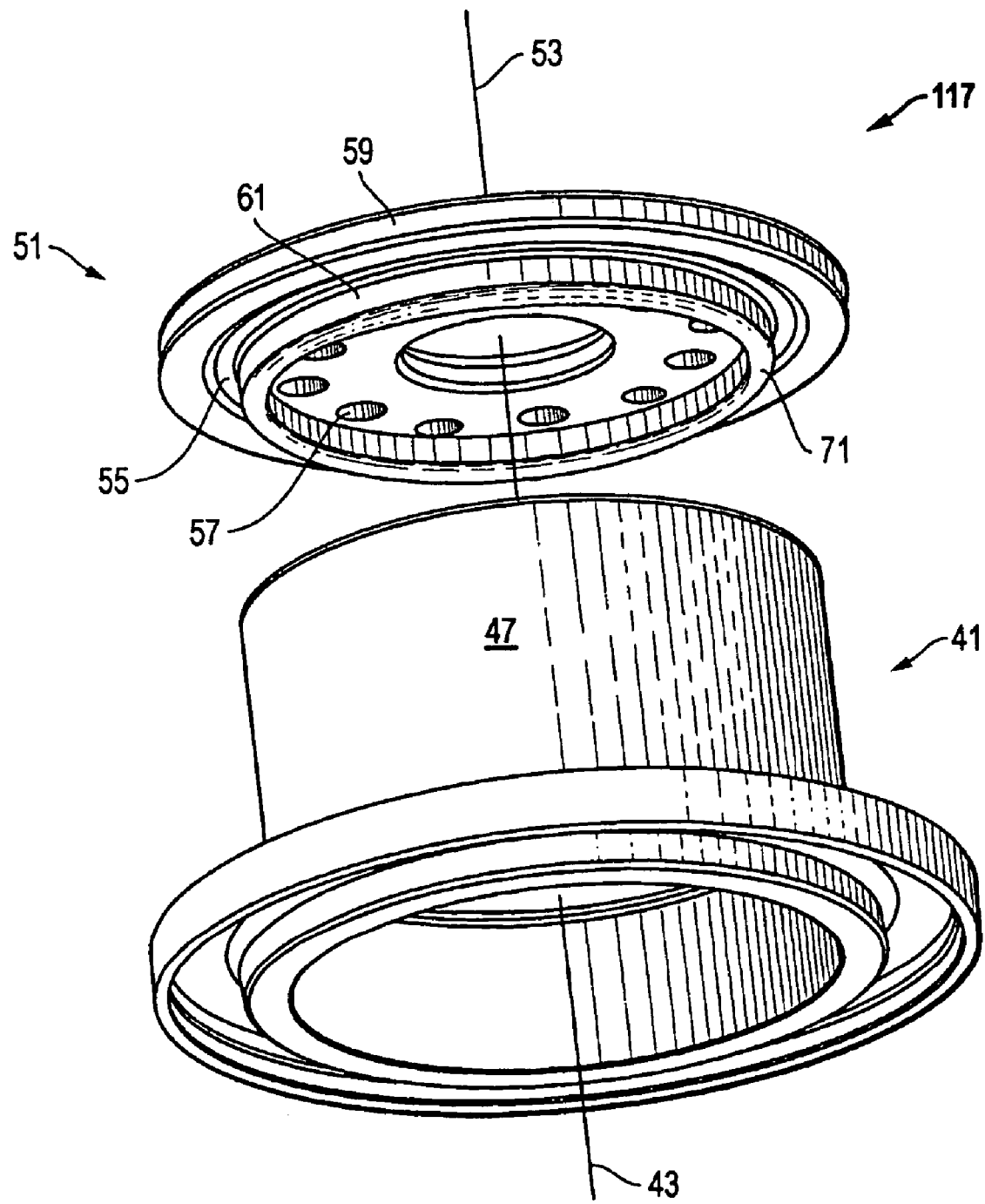
FIG. 4 is an exploded, bottom isometric view of one embodiment of a disk clamp and hub utilized by the disk drive of FIG. 3 and is constructed in accordance with the present invention.
Figure 5:
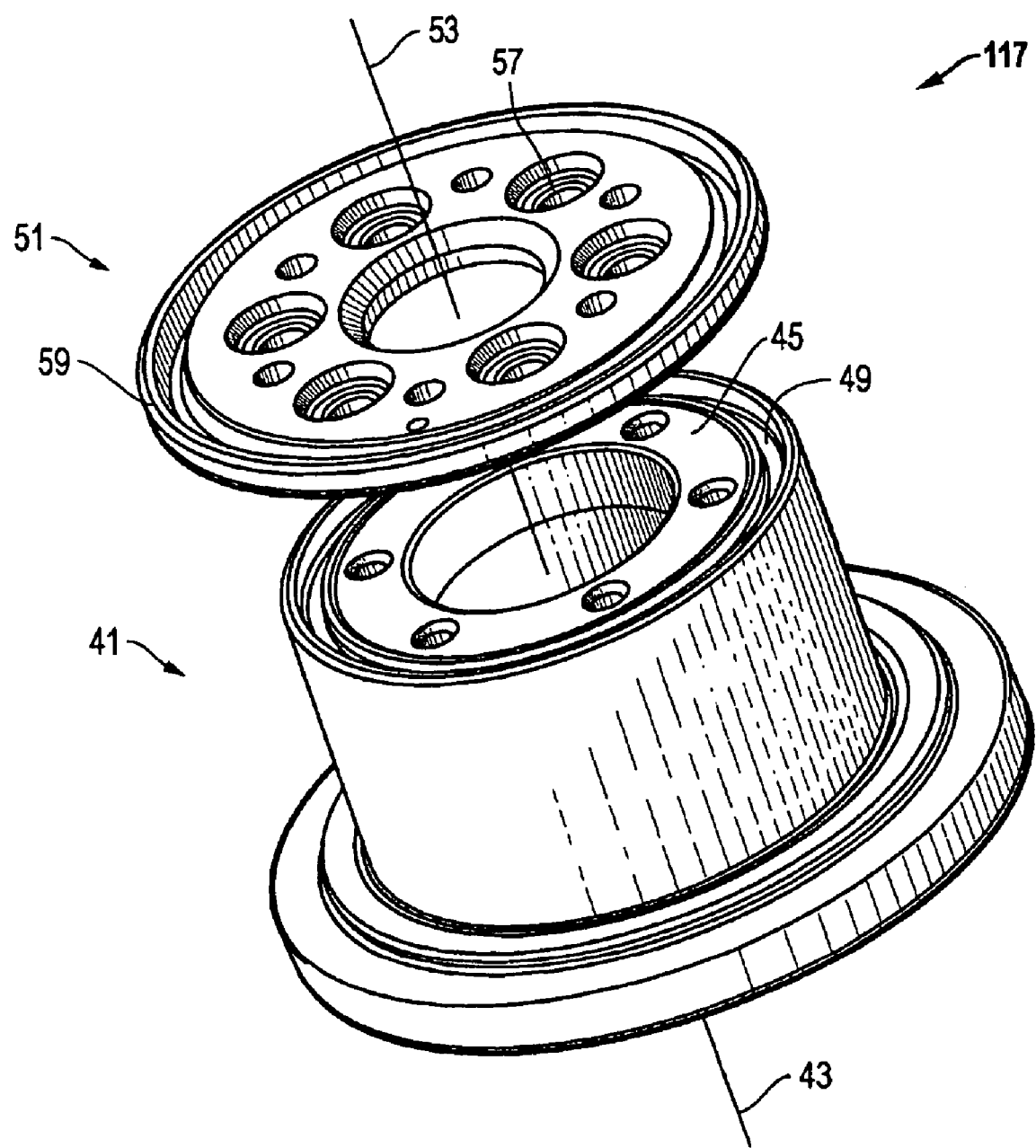
FIG. 5 is an exploded, top isometric view of the disk clamp and hub of FIG. 4 and is constructed in accordance with the present invention.
Figure 6:
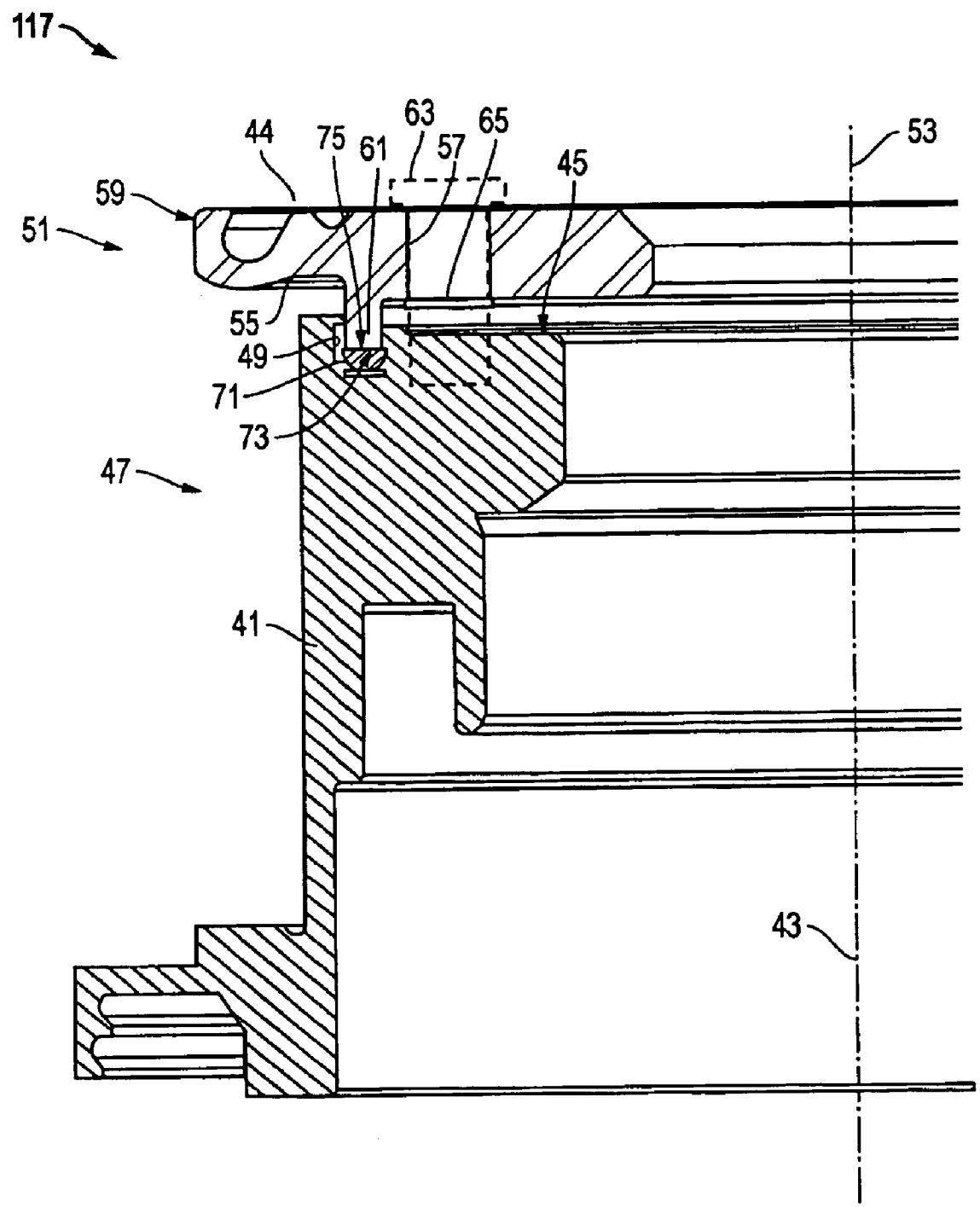
FIG. 6 is a sectional side view of the disk clamp and hub of FIG. 4 and is constructed in accordance with the present invention.

Referring now to FIGS. 4–6, one embodiment of a solution for solving lubricant migration problems associated with fasteners or screws for hub assemblies in disk drives is shown. The hub assembly 117 includes a hub 41 having an axis 43, a surface 45, a perimeter 47 that circumscribes the hub 41, and a recess 49 formed in the surface 45 between the axis 43 and the perimeter 47.

The hub assembly 117 further comprises a clamp or disk clamp 51 for securing the media disk 115 to the hub 41 of the spindle motor. In one embodiment, the disk clamp 51 has an axis 53, a surface 55, at least one fastener opening 57, a perimeter 59 that circumscribes the disk clamp 51, and a rib 61 protruding from the surface 55 and located radially between the perimeter 59 of the disk clamp 51 and the fastener opening 57. The rib 61 is designed to be positioned in the recess 49 in the hub 41.

As shown in FIG. 6, a fastener 63 having a lubricant 65 is used to extend through the fastener opening 57 to secure the disk clamp 51 to the hub 41 of the spindle motor. Since the lubricant 65 will tend to migrate in a radially outward direction (i.e., away from axes 43, 53), a system for preventing such migration is needed to prevent contamination within the disk drive 111. One embodiment of a solution for this potential problem incorporates a ring 71 that is mounted to the rib 61. The ring 71 is designed to extend between the rib 61 and the hub 41 to seal any lubricant 65 migrating in a radial direction away from the fastener 63 toward the media disk 115 or otherwise cause contamination within the disk drive 111.

In one embodiment, the surfaces 45, 55 are perpendicular to the axes 43, 53, and the recess 49 and the rib 61 are annular and circumscribe the hub 41 and disk clamp 51, respectively. The rib 61 may be provided with a flat surface 73 and the ring 71 has a flat surface 75 that may be bonded with an adhesive to the flat surface 73 of the rib 61.

In other optional embodiments, the disk clamp 51 may be formed from a metallic or composite material, such as aluminum, steel, or fiber-glass, and the hub 41 is formed from a metallic material, such as aluminum or steel. The ring 71 may be elastic and formed from an elastomeric material (such as rubber) so that it compensates for hub vibration to isolate the disk clamp 51 from the hub 41 and provide damping between the hub 41 and the disk clamp 51. Ring 71 may also function as a damping material, which can help with vibration absorption. In the embodiment shown, the ring 71 has a semi-circular, D-shaped sectional profile and is bonded to the rib 61.

The present invention has several advantages including the ability to prevent the migration of fastener lubricant. The elasticity of the ring compensates for hub vibration to better isolate and provide damping between the disk clamp from the hub.

While the invention has been shown or described in only some of its forms, it should be apparent to those skilled in the art that it is not so limited, but is susceptible to various changes without departing from the scope of the invention.

What is claimed is:

1. A disk drive, comprising:

a housing having a spindle motor with a hub, a media disk mounted to the spindle motor, an actuator having a read/write head for reading data from and writing data to the media disk;

the hub having an axis, a surface, a perimeter that circumscribes the hub, and a recess formed in the surface between the axis and the perimeter;

a disk clamp for securing the media disk to the spindle motor, the disk clamp having an axis, a surface, a fastener opening, a perimeter that circumscribes the disk clamp, and a rib protruding from the surface between the disk clamp perimeter and the fastener opening, the rib being positioned in the recess in the hub;

a fastener having a lubricant and extending through the fastener opening to secure the disk clamp to the spindle motor; and a ring mounted to the rib, the ring extending between the rib and the hub to seal any lubricant migrating in a radial direction away from the fastener toward the media disk.

2. The disk drive of claim 1, wherein the surfaces are perpendicular to the axes, and the recess and rib are annular and circumscribe the hub and disk clamp, respectively.

3. The disk drive of claim 1, wherein the rib has a flat surface and the ring has a flat surface that is bonded to the flat surface of rib.

4. The disk drive of claim 1, wherein the disk clamp is formed from a composite material and the hub is formed from a metallic material.

5. The disk drive of claim 1, wherein the ring is elastic and formed from an elastomeric material such that it compensates for hub vibration to isolate the disk clamp from the hub and provides damping between the hub and the disk clamp.

6. The disk drive of claim 1, wherein the ring has a D-shaped sectional profile and is bonded to the rib.

7. A disk drive, comprising:
 a housing having a spindle motor with a hub, a media disk mounted to the hub of the spindle motor, an actuator having a read/write head for reading data from and writing data to the media disk;
 the hub having an axis, a surface perpendicular to the axis, a perimeter that circumscribes the hub and is perpendicular to the surface, and a recess formed in the surface between the axis and the perimeter, the recess being annular and circumscribing the entire surface;
 a disk clamp for securing the media disk to the hub of the spindle motor, the disk clamp having an axis that is coaxial with the hub axis, a surface parallel to the hub, a perimeter that circumscribes the disk clamp, and a rib protruding from the surface between the disk clamp perimeter and fastener openings, the rib being positioned in the recess in the hub, the fastener openings being radially outboard of the axis and radially inboard of the rib;
 fasteners having a lubricant and extending through the fastener openings to secure the disk clamp to the spindle motor; and
 a ring formed from an elastomeric material and bonded to the rib, the ring extending from the rib into the recess and contacting the hub to seal any lubricant migrating in a radial direction away from the fasteners toward the media disk, the ring having elastic properties such that it compensates for hub vibration to isolate the disk clamp from the hub and provides damping between the disk clamp and the hub.

8. The disk drive of claim 7, wherein the disk clamp is formed from a composite material and the hub is formed from a metallic material.

9. The disk drive of claim 7, the rib has a flat surface, and the ring has a semi-circular, D-shaped sectional profile with a flat surface that is bonded to the flat surface of to the rib.

10. An apparatus, comprising:
 a hub having an axis, a surface, a perimeter that circumscribes the hub, and a recess formed in the surface between the axis and the perimeter;
 a clamp having an axis, a surface, a perimeter that circumscribes the clamp, and a rib protruding from the surface between the clamp perimeter and the axis, the rib being adapted to be positioned in the recess in the hub; and
 a ring mounted to the rib and adapted to extend between the rib and the hub to form a seal to prevent a liquid from migrating in a radial direction beyond the seal, the ring being elastic and formed from an elastomeric material such that the ring compensates for hub vibration to isolate the clamp from the hub and provides damping between the clamp and the hub.

11. The apparatus of claim 10, wherein the surfaces are perpendicular to the axes, and the recess and rib are annular and circumscribe the hub and disk clamp, respectively.

12. The apparatus of claim 10, wherein the rib has a flat surface, the ring has a flat surface, and the flat surface of the ring is bonded to the flat surface of the rib.

13. The apparatus of claim 10, wherein the clamp is formed from a composite material and the hub is formed from a metallic material.

14. The apparatus of claim 10, wherein the ring has a D-shaped sectional profile and is bonded to the rib.

* * * * *

UNITED STATES PATENT AND TRADEMARK OFFICE
CERTIFICATE OF CORRECTION

| | | |
|---|---|---|
| PATENT NO. | : 7,164,554 B2 | Page 1 of 1 |
| APPLICATION NO. | : 10/881263 | |
| DATED | : January 16, 2007 | |
| INVENTOR(S) | : Andre Sirilutporn Chan and Jr-Yi Shen | |

It is certified that error appears in the above-identified patent and that said Letters Patent is hereby corrected as shown below:

Title Page # (75) Inventors: should be Andre Sirilutporn Chan, add --Chan-- as last name of inventor Signed and Sealed this Seventeenth Day of April, 2007

JON W. DUDAS
*Director of the United States Patent and Trademark Office*